United States Patent
Xu et al.

(10) Patent No.: US 9,900,130 B2
(45) Date of Patent: Feb. 20, 2018

(54) METHOD AND DEVICE FOR SENDING SIGNAL, AND STORAGE MEDIUM

(71) Applicant: ZTE Corporation, Shenzhen, Guangdong (CN)

(72) Inventors: Hanqing Xu, Shenzhen (CN); Yajun Zhao, Shenzhen (CN); Linmei Mo, Shenzhen (CN); Yonghong Gao, Shenzhen (CN); Aijun Cao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/891,052

(22) PCT Filed: May 12, 2014

(86) PCT No.: PCT/CN2014/077317
§ 371 (c)(1),
(2) Date: Nov. 13, 2015

(87) PCT Pub. No.: WO2014/183629
PCT Pub. Date: Nov. 20, 2014

(65) Prior Publication Data
US 2016/0119093 A1 Apr. 28, 2016

(30) Foreign Application Priority Data

May 17, 2013 (CN) .......................... 2013 1 0186324

(51) Int. Cl.
*H04W 4/00* (2018.01)
*H04L 5/00* (2006.01)
(Continued)

(52) U.S. Cl.
CPC ........... *H04L 5/0032* (2013.01); *H04W 48/12* (2013.01); *H04W 48/16* (2013.01);
(Continued)

(58) Field of Classification Search
CPC ...... H04W 24/10; H04W 48/16; H04W 72/12
See application file for complete search history.

(56) References Cited

U.S. PATENT DOCUMENTS

| 8,717,987 | B2 | 5/2014 | Das |
| 2012/0106423 | A1 | 5/2012 | Nylander |

(Continued)

FOREIGN PATENT DOCUMENTS

| CN | 102804861 A | 11/2012 |
| CN | 102883408 A | 1/2013 |

(Continued)

OTHER PUBLICATIONS

International Search Report in international application No. PCT/CN2014/077317, dated Aug. 6, 2014, 2 pgs.
(Continued)

*Primary Examiner* — Khalid Shaheed
*Assistant Examiner* — K Wilford
(74) *Attorney, Agent, or Firm* — Cooper Legal Group, LLC

(57) ABSTRACT

Disclosed is a method for sending a signal, comprising: a small cell sending a discovery signal (DS) in a corresponding sending mode according to a current state of the small cell. Further disclosed is a device for sending a signal. In the present invention, according to the current state of the small cell, an access state of the small cell is adjusted in real time, thereby significantly reducing the interference of the small cell to a neighbor cell, improving the system performance, and being able to reduce the energy consumption of the small cell.

16 Claims, 4 Drawing Sheets

(51) Int. Cl.
*H04W 48/12* (2009.01)
*H04W 52/02* (2009.01)
*H04W 48/16* (2009.01)
*H04W 72/12* (2009.01)
*H04W 24/10* (2009.01)

(52) U.S. Cl.
CPC ....... *H04W 52/0206* (2013.01); *H04W 72/12* (2013.01); *H04W 24/10* (2013.01); *Y02B 60/50* (2013.01)

(56) References Cited

U.S. PATENT DOCUMENTS

| | | | |
|---|---|---|---|
| 2012/0182965 A1 | 7/2012 | Das | |
| 2014/0302856 A1* | 10/2014 | Nory | H04W 48/10 455/437 |
| 2014/0314000 A1* | 10/2014 | Liu | H04W 72/042 370/329 |

FOREIGN PATENT DOCUMENTS

| | | | |
|---|---|---|---|
| JP | 2012195828 A | 10/2012 | |
| JP | 2012529839 A | 11/2012 | |
| JP | 2012531080 A | 12/2012 | |

OTHER PUBLICATIONS

English Translation of the Written Opinion of the International Search Authority in international application No. PCT/CN2014/077317, dated Aug. 6, 2014, 15 pgs.

Supplementary European Search Report in European application No. 14797727.6, dated Mar. 18, 2016, 10 pgs.

ETRI: "Discovery signal design based on legacy signals", 3GPP Draft; RI-132559 SCE-Discovery, 3rd Generation Partnership Project (3GPP), Mobile Competence Centre; 650, Route Des Lucioles; F-06921 Sophia-Antipolis Cedex; France, vol. RAN WGI, no. Fukuoka, Japan; May 20, 2013-May 24, 2013, May 11, 2013 (May 11, 2013), XP050698276, Retrieved from the Internet: URL: http://www.3gpp.org/ftp/tsg ran/WGI RL1/TSGR1 73/Docs/ [retrieved on May 11, 2013] * Sections 2.1-2.2 *, mailed on May 11, 2013.

CMCC: "Procedures for efficient discovery of small cells", 3GPP Draft; RI-132547 Procedures for Efficient Discovery of Small Cells, 3rd Generation Partnership Project (3GPP), Mobile Competence Centre; 650, Route Des Lucioles; F-06921 Sophia-Antipolis Cedex, vol. RAN WGI, no. Fukuoka, Japan; May 20, 2013-May 24, 2013, May 11, 2013 (May 11, 2013), XP050698265, Retrieved from the Internet: URL: http://www.3gpp.org/ftp/tsg ran/WGI RL1/TSGR1 73/Docs/ [retrieved on May 11, 2013] * Section 2 *, mailed on May 11, 2013.

Qualcomm Incorporated: "Small cell discovery", 3GPP Draft; RI-132494 Small Cell Discovery, 3rd Generation Partnership Project (3GPP), Mobile Competence Centre; 650, Route Des Lucioles; F-06921 Sophia-Antipolis Cedex; France, vol. Ran WG1, no. Fukuoka, Japan; May 20, 2013-May 24, 2013, May 11, 2013 (May 11, 2013), XP050698212, Retrieved from the Internet: URL: http://www.3gpp.org/ftp/tsg ran/WG1 RL1/TSGR1 73/Docs/ [retrieved on May 11, 2013] * Sections 3-4 *, mailed on May 11, 2013.

"Interference Analysis on Small Cell On/Off Switching", May 2013, 3GPP TSG-RAN WG1#73 R1-132089, reprinted from the Internal at: URL:http://www.3gpp.org/ftp/tsg_ran/WG1_RL1/TSGR1_73/Docs/R1-132089.zip, 3 pgs.

CMCC: "Discussion on small cell architecture to support efficient operation", 3GPP Draft; RI-132550 Discussion on small cell architecture and interfaces interface fina, 3rd generation partnership project (3GPP), Mobile Competence Centre; 650 Route Des Lucioles; F-06921 Soph, vol. RAN WG1, no. Fukuoka, Japan; May 20, 2013-May 24, 2013, May 11, 2013 (May 11, 2013), XP050698268, Retrieved from the Internet: URL: http://www.3gpp.org/ftp/tsg ran/WG1 RL1/TSGR1 73/Docs/ [retrieved on May 11, 2013] * Sections 2.1-2.3, 2.4.1, 2.5 *, mailed on May 11, 2013.

"Analysis and Design Considerations of Cell on/off in Small Cell" May 2013, ,3GPP TSG-RAN WG1#73 R1-132236, URL:http://www.3gpp.org/ftp/tsg_ ran/WG1_RL1/TSGR1_73/Docs/R1-132236.zip, received in a communication from a foreign patent office dated Sep. 12, 2017, 7 pgs.

* cited by examiner

METHOD AND DEVICE FOR SENDING SIGNAL, AND STORAGE MEDIUM

TECHNICAL FIELD

The disclosure relates to cell interference reducing technology, and in particular to a signal sending method and device and non-transitory computer-readable storage medium.

BACKGROUND

With wide spread of Personal Computer (PC) services and smart User Equipment (UE), there is an increasingly high requirement on wireless communication experience, and in particular a communication rate. In a Long Term Evolution (LTE) standard and subsequent standard evolution, to enhance user perception and a system throughput, in particular to increase hotspot throughput, a networking architecture of Heterogeneous Networks (HetNet) is adopted, namely, a number of small cells are deployed within a coverage area of a Macro cell to enhance hotspot serving quality and throughput.

Although effective for increasing network capacity and reducing a coverage blind area, increasing a number of small cell nodes deployed in a hotspot may at the same time lead to a number of problems such as mutual interference, handover, energy consumption, and the like in an application scene with densely deployed small cells. Therefore, a small cell may be turned on when there is a system capacity increasing demand; and may be turned off when there is no additional capacity increasing demand and UE connection to reduce interference to an adjacent small cell and power consumption. When a UE is connected to another small cell (or the Macro cell), for mobility and network management purposes, it is necessary to discover another non-serving small cell. An effective solution for this may be to have a small cell node send a Discovery Signal (DS). A UE receives the DS and reports discovering and measuring information for determining whether to activate the small cell. Given interference and power consumption the DS may result in, it is unlikely to have a very short DS sending period.

FIG. 1 is a diagram of a typical small cell scene. As shown in FIG. 1, two small cells may work on a same frequency; and a Macro cell and a small cell may work on different frequencies or may work on a same frequency. A coverage area of the Macro cell may be within a thick-solid-line circle. A coverage area of a Small cell 1 may be within a thin-dashed-line circle. A coverage area of a Small cell 2 may be within a thin-solid-line circle.

In condition 1, when no UE is connected within the coverage area of the Small cell 1, the Small cell 1 may be in a sleep or shutdown state and send a DS. In this case, both UE1 and UE2 may be served by the Small cell 2. When the UE 1 and the UE 2 move from the Small cell 2 toward the Small cell 1 and successively enter the coverage area of the Small cell 1, the UE 1 may take the lead to detect the DS sent by the Small cell 1 and report discovering and measuring information. Meanwhile, the UE 2 may be yet to detect the DS sent by the Small cell 1. Therefore, the Small cell 1 knows that the UE 1 is within the coverage area per se without knowing the UE 2. In this case, both UE 1 and UE 2 remain being served by the Small cell 2. In this case, when the Small cell 1 enters an activated state, the Small cell 1 may result in strong interference to the UE 2 yet to discover the DS sent by the Small cell 1. In short, premature activation of a small cell in a deactivated state may result in strong interference to a UE in an adjacent cell.

In condition 2, after the Small cell 1 has served the UE 1 for a period of time, the UE 1 leaves the coverage area of the small cell, and no other UE is served within the Small cell 1. The Small cell 1 may sleep or shut down. However, when the UE 1 again returns to the coverage area of the Small cell 1, the Small cell 1 may reenter the activated state. When the UE 1 goes back and forth between the two small cells, the Small cell 1 may switch between the deactivated state and the activated state frequently, thus leading to constantly changing and fluctuating interference of the Small cell 1 to an adjacent cell. In short, when a small cell in the activated state enters a sleep state too early (premature sleep), this may result in fluctuating interference to a UE in an adjacent cell.

SUMMARY

At least to solve an aforementioned problem, an embodiment herein may provide a signal sending method and device and non-transitory computer-readable storage medium, where a small cell sends a Discovery Signal (DS) in a DS sending mode corresponding to a current state of the small cell, thus reducing interference of the small cell to an adjacent cell.

A technical solution according to an embodiment herein may be implemented as follows.

A signal sending method may include:

sending, by a small cell, a Discovery Signal (DS) in a DS sending mode corresponding to a current state of the small cell.

The DS sending mode may include a sending period and/or a sending pattern.

The sending pattern may include information on a carrier carrying the DS and information on a sub-frame for sending the DS within the sending period.

The information on the carrier may include information on a Resource Element RE carrying the DS and Resource Block RB number and location information.

The information on the sub-frame may include an offset the DS starts to be sent in every period, a number of a burst for sending the DS in every period, a number of a sub-frame contained in every burst, and a number of a sub-frame spacing adjacent bursts.

The method may further include:

after the DS sending mode of the small cell is updated, when the small cell is in an activated state, informing a UE and an adjacent cell of the updated DS sending mode by a Macro cell or the small cell and/or an adjacent cell adjacent to the small cell, and when the small cell is in a deactivated state, informing a UE and an adjacent cell of the updated DS sending mode by a Macro cell or an adjacent cell adjacent to the small cell.

For a sending period of M sub-frames, the DS may be sent in first N sub-frames of the M sub-frames with a spacing of P sub-frames. $P<N<M$.

The method may further include:

when the small cell is in an activated state, sending no DS, or the DS according to a short period and a sending pattern corresponding to the short period, or the DS according to a long period and a sending pattern corresponding to the long period.

The sending, by a small cell, a Discovery Signal (DS) in a DS sending mode corresponding to a current state of the small cell may include:

when it is determined that a UE is currently accessing the small cell, or that no UE is currently accessing the small cell and there have been multiple access activities within a set period, keeping the small cell in an activated state.

The method may further include:

when the small cell is in a sleep state, sending the DS according to a long period and a sending pattern corresponding to the long period.

The sending, by a small cell, a Discovery Signal (DS) in a DS sending mode corresponding to a current state of the small cell may include:

when the small cell enters a light sleep state from an activated state, sending the DS according to a short period and a sending pattern corresponding to the short period.

The sending, by a small cell, a Discovery Signal (DS) in a DS sending mode corresponding to a current state of the small cell may include:

when the small cell enters a deep sleep state from a light sleep state or an activated state, sending the DS according to a long period and a sending pattern corresponding to the long period.

The method may further include:

after the small cell enters a deep sleep state and then DS discovering and measuring information reported by a UE is received, making the small cell enter a light sleep state from the deep sleep state and send the DS according to a short period and a sending pattern corresponding to the short period.

The method may further include:

after the small cell enters a light sleep state from a deep sleep state and then receives, within a set number of short periods, DS measuring information reported by a second UE or no DS measuring information, determining whether to activate the small cell; and when it is determined to activate the small cell, sending no DS, or sending the DS according to the short period and a sending pattern corresponding to the short period, or sending the DS according to a long period and a sending pattern corresponding to the long period.

The method may further include:

when the small cell is in an activated state, performing, according to measuring information reported by a UE, service scheduling and interference coordination on a UE within a coverage area of the small cell.

A signal sending device may include a sending unit configured for sending a Discovery Signal (DS) in a DS sending mode corresponding to a current state of a small cell.

The DS sending mode may include a sending period and/or a sending pattern.

The sending pattern may include information on a carrier carrying the DS and information on a sub-frame for sending the DS within the sending period.

The device may further include an updating unit and an informing unit.

The updating unit may be configured for updating the DS sending mode of the small cell.

The informing unit may be configured for: when the small cell is in an activated state, informing a UE and an adjacent cell of the updated DS sending mode by a Macro cell or the small cell and/or an adjacent cell adjacent to the small cell; and when the small cell is in a deactivated state, informing a UE and an adjacent cell of the updated DS sending mode by a Macro cell or an adjacent cell adjacent to the small cell.

The device may further include:

a determining unit configured for: when the small cell is in an activated state, triggering sending, by the sending unit, no DS, or the DS according to a short period and a sending pattern corresponding to the short period, or the DS according to a long period and a sending pattern corresponding to the long period.

The device may further include:

a determining unit configured for: when determining that a UE is currently accessing the small cell, or that no UE is currently accessing the small cell and there have been multiple access activities within a set period, keeping the small cell in an activated state.

The device may further include:

a determining unit configured for: when determining that the small cell is in a sleep state, triggering sending, by the sending unit, the DS according to a long period and a sending pattern corresponding to the long period.

The device may further include:

a coordination unit configured for: when the small cell is in an activated state, performing, according to measuring information reported by a UE, service scheduling and interference coordination on a UE within a coverage area of the small cell.

A non-transitory computer-readable storage medium, may store a computer program configured for executing an aforementioned signal sending method.

Here, a small cell sends a DS in a DS sending mode corresponding to a current state of the small cell. The DS sending mode may include a sending period and/or a sending pattern. The sending pattern may include information on a carrier carrying the DS and information on a sub-frame for sending the DS within the sending period. After the DS sending mode of the small cell is updated, when the small cell is in an activated state, a UE in the small cell may be informed of the updated DS sending mode. When the small cell is in a deactivated state, a UE in another small cell in the activated state may be informed of the updated DS sending mode by the another small cell. With the disclosure, a DS sending mode may be adjusted in real time according to a current state of a small cell, thus greatly reducing interference of the small cell to an adjacent cell, enhancing system performance, and reducing energy consumption of the small cell.

DETAILED DESCRIPTION

To clearly show a technical solution herein and advantages thereof, the disclosure is further elaborated below with reference to embodiments and drawings.

Figure 2:
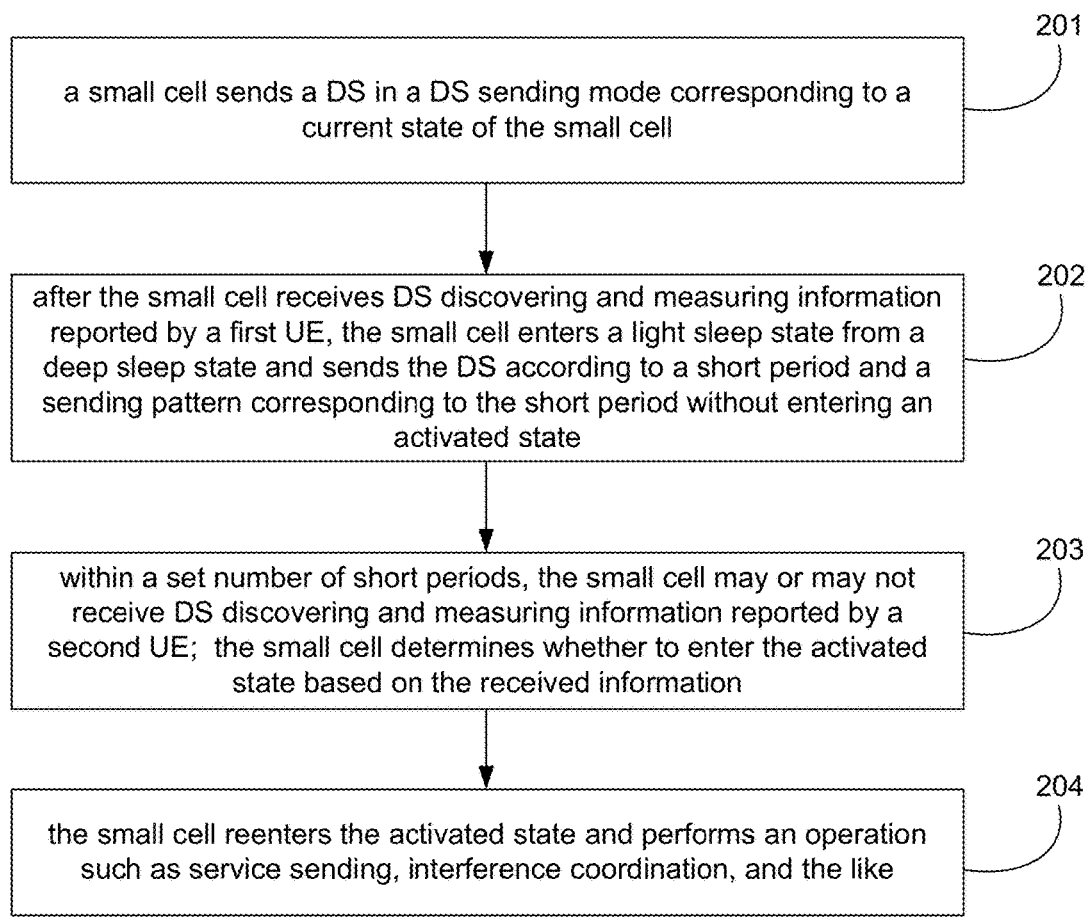
FIG. 2 is a flowchart of a signal sending method herein.

FIG. 2 is a flowchart of a signal sending method herein. As shown in FIG. 2, a signal sending method herein may include steps as follows.

In step 201, a small cell sends a DS in a DS sending mode corresponding to a current state of the small cell. The DS sending mode may include a sending period and/or a sending pattern.

Here, the sending period may include a short period and a long period. The short period may be several Milliseconds or tens of Milliseconds. The long period may be several hundreds of Milliseconds. A sending period for sending the DS may depend on the current state of a small cell.

Here, the sending pattern may include information on a carrier carrying the DS such as information on a sub-carrier or a carrier frequency, and information on a sub-frame for sending the DS within the sending period. For example, with a sending period of 100 sub-frames, the DS may be sent in a total of 3 times every 5 sub-frames within the first 15 sub-frames, while sending no DS in the remaining time. Within the sending period, sending the DS for multiple times may facilitate more timely, accurate DS receiving and correct feedback by a UE (with respect to sending the DS for just one time). Likewise, within the sending period, carrying the DS information by more RBs (with respect to fewer RBs) may also facilitate more timely, accurate DS receiving and correct feedback by a UE. Sending patterns respectively corresponding to the short period and the long period may be set according to such a rule. For example, the short period may be set as 5 sub-frames, within which it is not necessary to send the DS for multiple times; instead, the DS may be sent by multiple RBs. The long period may be set as 100 sub-frames, within which the DS may be sent for multiple times or by multiple RBs. There may be a lot of sending patterns, which are not elaborated below.

After the DS sending mode of the small cell is updated, when the small cell is in an activated state, a UE may be informed of the updated DS sending mode by a Macro cell or the small cell and/or an adjacent cell adjacent to the small cell. When the small cell is in a deactivated state, a UE may be informed of the updated DS sending mode by a Macro cell or an adjacent cell adjacent to the small cell. Adjustment to the DS sending mode below may be informed as described, which is not repeated below.

A small cell may determine whether to enter a sleep state and to enter what kind of a sleep state according to a factor such as UE connection condition and capacity demand within a coverage area or the like. Then, a DS may be sent in a DS sending mode corresponding to a current state of the small cell.

a. When within a counting period, a small cell counts that there is a UE connected up to the moment; or although no UE is being connected, there have been multiple UE connections within the period, the small cell may enter no sleep state, and remain in the activated state. No DS may be sent. Alternatively, the DS may be sent according to a short period and a sending pattern corresponding to the short period. Alternatively, the DS may be sent according to a long period and a sending pattern corresponding to the long period.

A small cell in the activated state may send no DS, or send the DS according to the long period, mainly to avoid interfering an adjacent cell and to reduce power consumption. A small cell in the activated state may send the DS according to the short period, mainly to allow a UE to quickly discover and hand over to the small cell. How a small cell in the activated state sends the DS may depend on a system demand.

Here, the counting period may be a long period of time compared with a DS sending period. For example, a counting period of a small cell may be 1 minute, within which there is UE connection, or although no UE connection, there have been multiple (such as 10 or more) UE connections. Then, the small cell may enter no sleep state, namely, remain in the activated state.

b. When within a counting period, a small cell counts a fewer times of UE entering and leaving the coverage area of the cell, the small cell may enter a light sleep state from the activated state and send the DS. The DS may be send according to the short period and a sending pattern corresponding to the short period. A short period and a corresponding sending pattern thereto may be as described.

In the step, a light sleep state may be a period of time in which a small cell just enters a sleep state from the activated state.

For example, the small cell may perform counting for 1 minute, during which there is 2 times of UE connection, and no UE is being connected at the moment. Then, the small cell may enter the light sleep state, and send the DS according to the short period and a sending pattern corresponding to the short period.

c. When within a counting period, a small cell counts no UE connection and service sending at all, the small cell may enter a deep sleep state from the activated state or the light sleep state and send the DS according to the long period.

For example, the small cell may perform counting for 1 minute, during which no UE connection and service sending is counted at all. Then, the small cell may enter the deep sleep state, sending the DS according to the long period and a sending pattern corresponding to the long period.

In step 202, after the small cell receives DS discovering and measuring information reported by a first UE, the small cell enters a light sleep state from a deep sleep state and sends the DS according to a short period and a sending pattern corresponding to the short period without entering an activated state for the time being.

In the step, the light sleep state may be a period of time of transition from the sleep state to the activated state.

After a small cell enters a deep sleep (state) and then the Macro cell or another adjacent small cell in the activated state receives DS discovering and measuring information reported by a first UE, the DS sending period of the small cell in the sleep state may be adjusted to the short period, and instead of directly entering the activated state, the small cell in the sleep state may enter the light sleep state from the deep sleep state for the time being.

UE-reported information may be received first by the Macro cell or an adjacent small cell in the activated state, and then forwarded to the small cell in the sleep state. Alternatively, the Macro cell or the small cell in the activated state may first receive the information, and then directly send a period and pattern adjusting command to the small cell in the sleep state. A state of a small cell (activated or sleeping) may be adjusted by the Macro cell, another the small cell in the activated state, and/or the small cell in the sleep state per se.

For example, UE-reported information may first be fed back to the Macro cell. The Macro cell may then determine a state of a sleeping small cell.

In step 203, within a set number of short periods (one or more DS short periods), the small cell may or may not receive DS discovering and measuring information reported by a second UE; the small cell determines whether to enter the activated state based on the received information. When activated, the small cell may stop sending the DS, or send the DS according to the short period and a sending pattern corresponding to the short period or according to the long period and a sending pattern corresponding to the long period.

In step 204, after reentering the activated state, the small cell may schedule a UE, send a service, and/or perform interference coordination on any known UE within the coverage area according to measuring information reported by a UE.

To better understand an aforementioned embodiment, elaboration is made below with reference to embodiments and relevant drawings.

Figure 1:
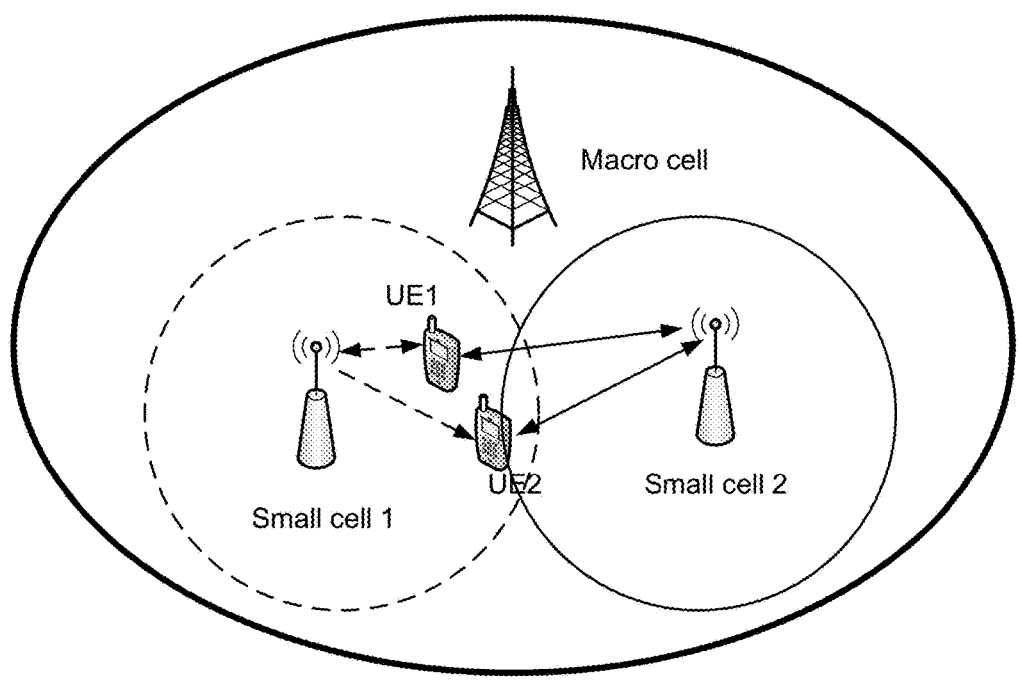
FIG. 1 is a diagram of a typical small cell scene.

First a small cell scene as follows is assumed. As shown in FIG. 1, two small cells may work on a same frequency. A Macro cell and a small cell may work on different frequencies or may work on a same frequency. A coverage area of the Macro cell may be within a thick-solid-line circle. A coverage area of Small cell 1 may be within a thin-dashed-line circle. A coverage area of Small cell 2 may be within a thin-solid-line circle. UE1 and UE2 exist simultaneously, at locations as shown in FIG. 1.

Figure 3:
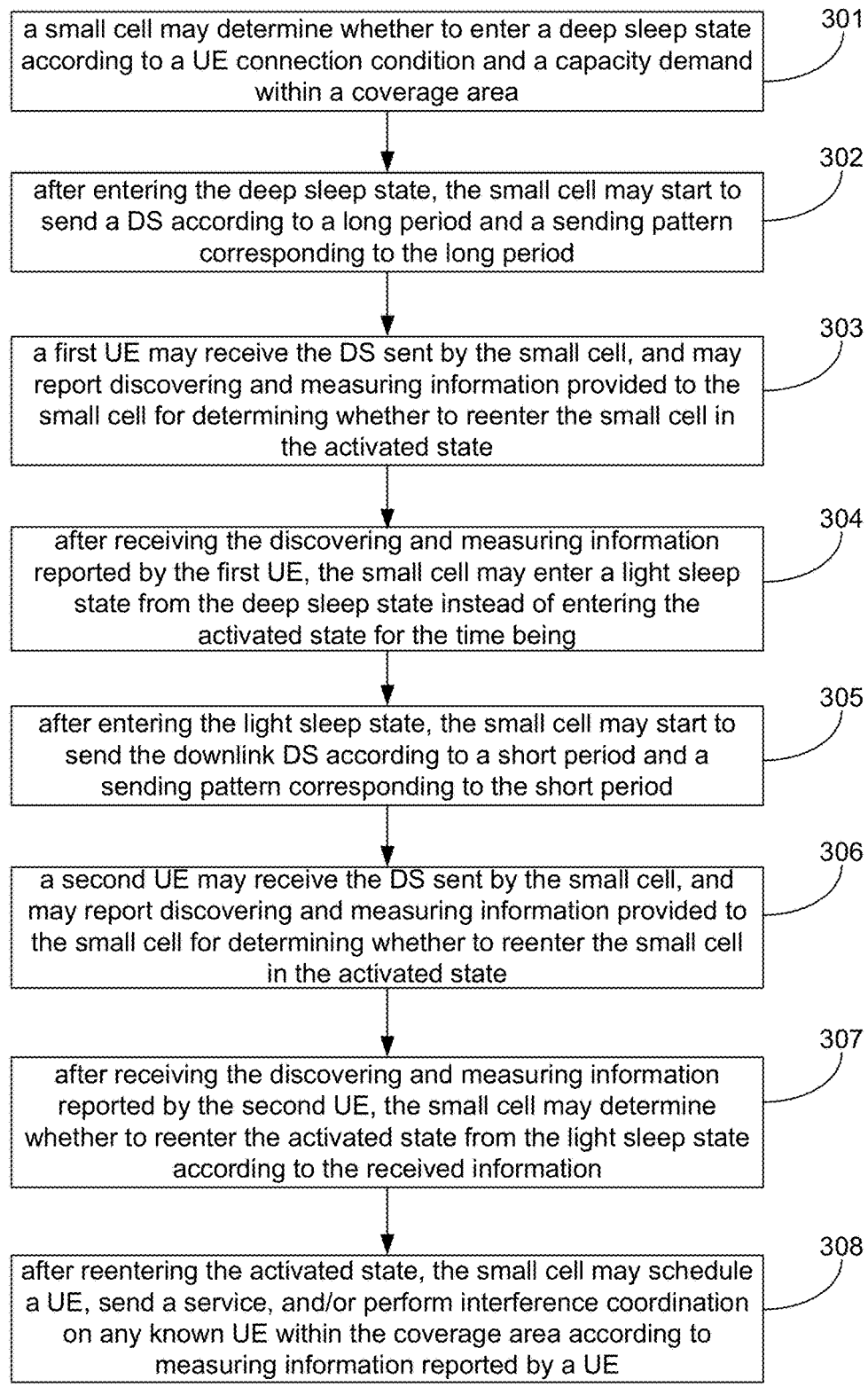
FIG. 3 is a flowchart of a signal sending method according to an example herein.

FIG. 3 is a flowchart of a signal sending method according to an example herein. As shown in FIG. 3, a signal sending method according to the example may include steps as follows.

In step 301, a small cell may determine whether to enter a deep sleep state according to a UE connection condition and a capacity demand within a coverage area.

The UE 1 and the UE 2 in FIG. 1 may not be in the coverage area of the Small cell 1 but may be in the coverage area of the Small cell 2, and may both be served by the Small cell 2. The Small cell 1 may detect that there is no UE connection. After counting for a period of time, the Small cell 1 may determine, according to the counting, that there is no UE connection and service sending at all within the counting period. The Small cell 1 may then determine to enter the deep sleep state, and to stop sending any service and control channel.

In step 302, after entering the deep sleep state, the small cell may start to send a DS according to a long period and a sending pattern corresponding to the long period.

Upon determining to enter the deep sleep state, the Small cell 1 may start sending the DS. The DS sending period corresponding to the deep sleep state may be set as the long period. The long period may be several hundreds of Milliseconds such as 100 ms. A long period is set to reduce interference to an adjacent cell and power consumption. According to a sending pattern corresponding to the long period the DS may be sent in a total of 3 times every 5 sub-frames within the first 15 sub-frames. An RB number may be set according to a rule allowing timely and effective UE receiving.

In step 303, a first UE may receive the DS sent by the small cell, and may report discovering and measuring information provided to the small cell for determining whether to reenter the small cell in the activated state.

when the UE 1 and the UE 2 move from the Small cell 2 toward the Small cell 1 and successively enter the coverage area of the Small cell 1, the UE 1 may take the lead to detect the DS sent by the Small cell 1 and report discovering and measuring information. Meanwhile, the UE 2 may be yet to detect the DS sent by the Small cell 1. Therefore, the Small cell 1 knows that the UE 1 is within the coverage area per se without knowing the UE 2. In this case, both UE 1 and UE 2 remain being served by the Small cell 2. In this case, when the Small cell 1 enters an activated state, this may result in strong interference to the UE 2 yet to discover the DS sent by the Small cell 1.

In step 304, after receiving the discovering and measuring information reported by the first UE, the small cell may enter a light sleep state from the deep sleep state instead of entering the activated state for the time being.

After receiving discovering and measuring information reported by the UE 1, the Small cell 1 knows that the UE 1 is within the coverage area per se. However, the Small cell 1 does not know that the UE 2 is also within the coverage area per se. Therefore, the Small cell 1 does not reenter the activated state for the time being, However, the Small cell 1 may be adjusted to enter the light sleep state from the deep sleep state.

In step 305, after entering the light sleep state, the small cell may start to send the downlink DS according to a short period and a sending pattern corresponding to the short period.

After determining to enter the light sleep state, to allow the UE 2 to receive the DS as soon as possible, the Small cell 1 may start sending the DS according to the short period and a sending pattern corresponding to the short period. The short period may be several Milliseconds or tens of Milliseconds. For example, the short period may be set as 10 ms or less. According to a sending pattern corresponding to the short period, the DS may be sent for just one time within the short period. An RB number may be set according to a rule allowing timely and effective UE receiving.

In step 306, a second UE may receive the DS sent by the small cell, and may report discovering and measuring information provided to the small cell for determining whether to reenter the small cell in the activated state.

As the DS is sent according to the short period, the UE 2 may quickly receive the DS sent by the Small cell 1, and report, to the Small cell 1, discovering and measuring information provided to the small cell for determining whether to reenter the activated state.

In step 307, after receiving the discovering and measuring information reported by the second UE, the small cell may determine whether to reenter the activated state from the light sleep state according to the received information.

after receiving information reported by the UE 2, the Small cell 1 knows any UE covered per se, and thus may determine, according to UE-reported information, whether to reenter the activated state.

In step 308, after reentering the activated state, the small cell may schedule a UE, send a service, and/or perform interference coordination on any known UE within the coverage area according to measuring information reported by a UE.

After entering the activated state, a small cell may send no DS. Alternatively, the small cell may send the DS according to a short period and a sending pattern corresponding to the short period. Alternatively, the small cell may send the DS according to a long period and a sending pattern corresponding to the long period. A small cell in the activated state sending no DS, or send the DS according to the long period, mainly to avoid interfering an adjacent cell and to reduce power consumption. A small cell in the activated state may send the DS according to the short period, mainly to allow a UE to quickly discover and hand over to the small cell. How a small cell in the activated state sends the DS may depend on a system demand.

Figure 4:
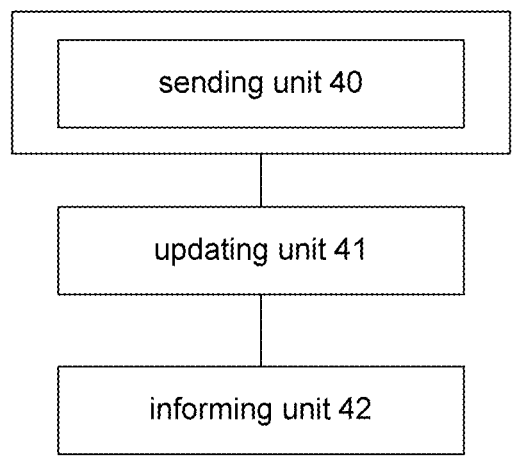
FIG. 4 is a diagram of a structure of a signal sending device herein.

FIG. 4 is a diagram of a structure of a signal sending device herein. As shown in FIG. 4, a signal sending device herein may include a sending unit 40 configured for sending a Discovery Signal (DS) in a DS sending mode corresponding to a current state of a small cell.

The DS sending mode may include a sending period and/or a sending pattern.

The sending pattern may include information on a carrier carrying the DS and information on a sub-frame for sending the DS within the sending period.

Based on a signal sending device shown in FIG. 4, a signal sending device herein may further include an updating unit 41 and an informing unit 42.

The updating unit 41 may be configured for updating the DS sending mode of the small cell.

The informing unit 42 may be configured for: when the small cell is in an activated state, informing a UE and an adjacent cell of the updated DS sending mode by a Macro cell or the small cell and/or an adjacent cell adjacent to the small cell; and when the small cell is in a deactivated state, informing a UE and an adjacent cell of the updated DS sending mode by a Macro cell or an adjacent cell adjacent to the small cell.

Based on a signal sending device shown in FIG. 4, a signal sending device herein may further include a determining unit (not shown in FIG. 4) configured for: when the small cell is in an activated state, triggering sending, by the sending unit, no DS, or the DS according to a short period and a sending pattern corresponding to the short period, or the DS according to a long period and a sending pattern corresponding to the long period.

Alternatively, based on a signal sending device shown in FIG. 4, a signal sending device herein may also include a determining unit (not shown in FIG. 4) configured for: when determining that a UE is currently accessing the small cell, or that no UE is currently accessing the small cell and there have been multiple access activities within a set period, keeping the small cell in an activated state.

Alternatively, based on a signal sending device shown in FIG. 4, a signal sending device herein may also include a determining unit (not shown in FIG. 4) configured for: when determining that the small cell is in a sleep state, triggering sending, by the sending unit, the DS according to a long period and a sending pattern corresponding to the long period.

Aforementioned determining units may also exist in one signal sending device, and may be denoted by a first the determining unit, a second the determining unit, and a third determining unit, for example.

When the small cell enters a deep sleep state from a light sleep state or an activated state, sending the DS according to a long period and a sending pattern corresponding to the long period.

After the small cell enters a deep sleep state and then DS discovering and measuring information reported by a UE is received, making the small cell enter a light sleep state from the deep sleep state and send the DS according to a short period and a sending pattern corresponding to the short period.

Base on the device shown in FIG. 4, a device may further include a coordination unit (not shown in FIG. 4) configured for: when the small cell is in an activated state, performing, according to measuring information reported by a UE, service scheduling and interference coordination on a UE within a coverage area of the small cell.

Those skilled in the art will understand that a function of a processing unit in a signal sending device shown in FIG. 4 may be understood with reference to description relevant to an aforementioned signal sending method and an embodiment thereof. Those skilled in the art will understand that a function of a processing unit in a signal sending device shown in FIG. 4 may be realized by a program run on a processor, and may also be realized by a specific logic circuit.

An embodiment herein may further provide a non-transitory computer-readable storage medium, storing a computer program configured for executing a signal sending method according to an aforementioned embodiment.

Clearly, those skilled in the art will understand that aforementioned a module or a step herein may be realized by a universal computing device, and may be located on a single computing device or distributed in a network of multiple computing devices. They may be realized by computing device executable program codes, thus may be stored on a storing device and executed by a computing device. In some cases, steps herein may be executed in a sequence other than one describe herein, or may be made into respective integrated circuit modules. Alternatively, multiple modules or steps herein may be made into a single integrated circuit module. Therefore, the disclosure is not limited to any specific combination of hardware and software.

What described are merely embodiments herein and are not intended to limit a protection scope herein.

INDUSTRIAL APPLICABILITY

With a technical solution according to an embodiment herein, a DS sending mode may be adjusted in real time according to a current state of a small cell, thus greatly reducing interference of the small cell to an adjacent cell, enhancing system performance, and reducing energy consumption of the small cell.

The invention claimed is:

1. A signal sending method, comprising:
sending, by a small cell, a Discovery Signal (DS) in a DS sending mode corresponding to a current state of the small cell,
wherein the DS sending mode comprises a sending period and a sending pattern,
wherein the sending pattern comprises information on a carrier carrying the DS and information on a sub-frame for sending the DS within the sending period,
wherein the information on the carrier comprises information on a Resource Element (RE) carrying the DS and Resource Block (RB) number and location information,
wherein the information on the sub-frame comprises an offset the DS starts to be sent in every period, a number of a burst for sending the DS in every period, a number of a sub-frame contained in every burst, and a number of a sub-frame spacing adjacent bursts,
wherein for a sending period of M sub-frames, the DS is sent in first N sub-frames of the M sub-frames with a spacing of P sub-frames, wherein $P<N<M$.

2. The method according to claim 1, further comprising:
after the DS sending mode of the small cell is updated, when the small cell is in an activated state, informing a UE and an adjacent cell of the updated DS sending mode by a Macro cell or the small cell and/or an adjacent cell adjacent to the small cell, and when the small cell is in a deactivated state, informing a UE and an adjacent cell of the updated DS sending mode by a Macro cell or an adjacent cell adjacent to the small cell.

3. The method according to claim 1, further comprising:
when the small cell is in an activated state, sending no DS, or the DS according to a short period and a sending pattern corresponding to the short period, or the DS according to a long period and a sending pattern corresponding to the long period.

4. The method according to claim 1, wherein the sending, by a small cell, a Discovery Signal (DS) in a DS sending mode corresponding to a current state of the small cell comprises:
when it is determined that a UE is currently accessing the small cell, or that no UE is currently accessing the small cell and there have been multiple access activities within a set period, keeping the small cell in an activated state.

5. The method according to claim 1, further comprising:
when the small cell is in a sleep state, sending the DS according to a long period and a sending pattern corresponding to the long period.

6. The method according to claim 1, wherein the sending, by a small cell, a Discovery Signal (DS) in a DS sending mode corresponding to a current state of the small cell comprises:
when the small cell enters a light sleep state from an activated state, sending the DS according to a short period and a sending pattern corresponding to the short period.

7. The method according to claim 1, wherein the sending, by a small cell, a Discovery Signal (DS) in a DS sending mode corresponding to a current state of the small cell comprises:
when the small cell enters a deep sleep state from a light sleep state or an activated state, sending the DS according to a long period and a sending pattern corresponding to the long period.

8. The method according to claim 1, further comprising:
after the small cell enters a deep sleep state and then DS discovering and measuring information reported by a UE is received, making the small cell enter a light sleep state from the deep sleep state and send the DS according to a short period and a sending pattern corresponding to the short period.

9. The method according to claim 1, further comprising:
after the small cell enters a light sleep state from a deep sleep state and then receives, within a set number of short periods, DS measuring information reported by a second UE or no DS measuring information, determining whether to activate the small cell; and when it is determined to activate the small cell, sending no DS, or sending the DS according to the short period and a sending pattern corresponding to the short period, or sending the DS according to a long period and a sending pattern corresponding to the long period.

10. The method according to claim 9, further comprising:
when the small cell is in an activated state, performing, according to measuring information reported by a UE, service scheduling and interference coordination on a UE within a coverage area of the small cell.

11. A signal sending device, comprising
a sending unit configured for sending a Discovery Signal (DS) in a DS sending mode corresponding to a current state of a small cell,
wherein the DS sending mode comprises a sending period and a sending pattern,
wherein the sending pattern comprises information on a carrier carrying the DS and information on a sub-frame for sending the DS within the sending period,
wherein the information on the carrier comprises information on a Resource Element (RE) carrying the DS and Resource Block (RB) number and location information,
wherein the information on the sub-frame comprises an offset the DS starts to be sent in every period, a number of a burst for sending the DS in every period, a number of a sub-frame contained in every burst, and a number of a sub-frame spacing adjacent bursts,
wherein for a sending period of M sub-frames, the DS is sent in first N sub-frames of the M sub-frames with a spacing of P sub-frames, wherein P<N<M.

12. The device according to claim 11,
further comprising an updating unit and an informing unit, wherein
the updating unit is configured for updating the DS sending mode of the small cell;
the informing unit is configured for: when the small cell is in an activated state, informing a UE and an adjacent cell of the updated DS sending mode by a Macro cell or the small cell and/or an adjacent cell adjacent to the small cell; and when the small cell is in a deactivated state, informing a UE and an adjacent cell of the updated DS sending mode by a Macro cell or an adjacent cell adjacent to the small cell.

13. The device according to claim 11, further comprising:
a determining unit configured for: when the small cell is in an activated state, triggering sending, by the sending unit, no DS, or the DS according to a short period and a sending pattern corresponding to the short period, or the DS according to a long period and a sending pattern corresponding to the long period; and/or
a determining unit configured for: when determining that a UE is currently accessing the small cell, or that no UE is currently accessing the small cell and there have been multiple access activities within a set period, keeping the small cell in an activated state.

14. The device according to claim 11, further comprising:
a determining unit configured for: when determining that the small cell is in a sleep state, triggering sending, by the sending unit, the DS according to a long period and a sending pattern corresponding to the long period.

15. The device according to claim 11, further comprising:
a coordination unit configured for: when the small cell is in an activated state, performing, according to measuring information reported by a UE, service scheduling and interference coordination on a UE within a coverage area of the small cell.

16. A non-transitory computer-readable storage medium, storing a computer program configured for executing a signal sending method, the method comprising:
sending, by a small cell, a Discovery Signal (DS) in a DS sending mode corresponding to a current state of the small cell,
wherein the DS sending mode comprises a sending period and a sending pattern,
wherein the sending pattern comprises information on a carrier carrying the DS and information on a sub-frame for sending the DS within the sending period,
wherein the information on the carrier comprises information on a Resource Element (RE) carrying the DS and Resource Block (RB) number and location information,
wherein the information on the sub-frame comprises an offset the DS starts to be sent in every period, a number of a burst for sending the DS in every period, a number of a sub-frame contained in every burst, and a number of a sub-frame spacing adjacent bursts,
wherein for a sending period of M sub-frames, the DS is sent in first N sub-frames of the M sub-frames with a spacing of P sub-frames, wherein P<N<M.

* * * * *